(12) United States Patent
Chien et al.

(10) Patent No.: US 10,440,010 B2
(45) Date of Patent: *Oct. 8, 2019

(54) SYSTEM AND METHOD TO SHARE A RESOURCE OR A CAPABILITY OF A DEVICE

(71) Applicants: AT&T INTELLECTUAL PROPERTY I, L.P., Atlanta, GA (US); AT&T MOBILITY II LLC, Atlanta, GA (US)

(72) Inventors: Ginger Chien, Bellevue, WA (US); Yehoshuva Arasavelli, Redmond, WA (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,916

(22) Filed: Jan. 2, 2018

(65) Prior Publication Data
US 2018/0124038 A1 May 3, 2018

Related U.S. Application Data

(63) Continuation of application No. 15/403,655, filed on Jan. 11, 2017, now Pat. No. 9,866,550, which is a
(Continued)

(51) Int. Cl.
*H04L 9/00* (2006.01)
*H04L 29/06* (2006.01)
(Continued)

(52) U.S. Cl.
CPC ........ *H04L 63/083* (2013.01); *H04L 63/0807* (2013.01); *H04L 63/10* (2013.01);
(Continued)

(58) Field of Classification Search
CPC . H04L 63/083; H04L 63/0807; H04L 63/101; H04W 12/08; H04W 12/06
See application file for complete search history.

(56) References Cited

U.S. PATENT DOCUMENTS

| 6,057,856 A | 5/2000 | Miyashita et al. |
| 7,395,126 B2 | 7/2008 | Decker |

(Continued)

FOREIGN PATENT DOCUMENTS

| EP | 1279081 B1 | 1/2003 |
| WO | 9841020 A1 | 9/1998 |

(Continued)

OTHER PUBLICATIONS

AT&T U-verse News Release: "Baseball Fans Get to 'Choose You Own Camera Angle' with AT&T U-verse TV's Chicago Cubs Multiview App", Chicago, Illinois, Aug. 5, 2010, 2 pages.

(Continued)

*Primary Examiner* — Beemnet W Dada
(74) *Attorney, Agent, or Firm* — Toler Law Group, PC

(57) ABSTRACT

A method includes transmitting, from a first device, a message indicating that the first device is available to share a resource. The method includes receiving, at the first device, a request to use the resource, the request received from a second device, where the request includes identification information. The method includes, based on a determination that the second device is unknown to the first device, determining whether the second device is authenticated based on the authentication information. The method includes receiving, at the first device from the second device, settings information associated with the resource and adjusting a setting of the first device based on the settings information. The method also includes, based on determin- (Continued)

ing that the second device is authenticated, sharing the resource of the first device with the second device.

20 Claims, 7 Drawing Sheets

Related U.S. Application Data continuation of application No. 14/479,564, filed on Sep. 8, 2014, now Pat. No. 9,560,050.

(51) Int. Cl.
*H04L 29/08* (2006.01)
*H04W 12/06* (2009.01)
*H04W 12/08* (2009.01)

(52) U.S. Cl.
CPC ............ *H04L 63/101* (2013.01); *H04L 67/16* (2013.01); *H04W 12/06* (2013.01); *H04W 12/08* (2013.01)

(56) References Cited

U.S. PATENT DOCUMENTS

| | | | |
|---|---|---|---|
| 8,723,951 | B2 | 5/2014 | Ahiska et al. |
| 8,732,593 | B2 | 5/2014 | Van Wie et al. |
| 2003/0189589 | A1 | 10/2003 | LeBlanc et al. |
| 2004/0013192 | A1 | 1/2004 | Kennedy |
| 2008/0046953 | A1 | 2/2008 | Kossila |
| 2008/0214253 | A1 | 9/2008 | Gillo et al. |
| 2011/0185383 | A1 | 7/2011 | Kelter |
| 2011/0231914 | A1* | 9/2011 | Hung .................... G06F 21/335 726/7 |
| 2012/0219271 | A1 | 8/2012 | Vunic et al. |
| 2012/0327226 | A1 | 12/2012 | Pineau et al. |
| 2013/0007788 | A1 | 1/2013 | Levinson et al. |
| 2013/0259447 | A1 | 10/2013 | Sathish et al. |
| 2013/0342346 | A1 | 12/2013 | Hazzani |
| 2014/0071349 | A1 | 3/2014 | Ramo et al. |
| 2015/0244756 | A1* | 8/2015 | Liu ......................... H04L 65/60 709/217 |
| 2016/0012487 | A1 | 1/2016 | Bastaldo-Tsampalis et al. |

FOREIGN PATENT DOCUMENTS

| | | |
|---|---|---|
| WO | 0139506 A2 | 5/2001 |
| WO | 03047710 A2 | 6/2003 |
| WO | 2006082566 A1 | 8/2006 |
| WO | 2008155348 A1 | 12/2008 |
| WO | 2014001607 A1 | 1/2014 |

OTHER PUBLICATIONS

Fraunhofer-Gesellschaft, Research News, "Soccer matches and concerts from any angle you choose", Aug. 1, 2013, 2 pages.
Quick, D., "OmniCam360 would let viewers choose the camera angle", Aug. 9, 2013, Gizmag Online Store, 5 pages.

* cited by examiner

SYSTEM AND METHOD TO SHARE A RESOURCE OR A CAPABILITY OF A DEVICE

CLAIM OF PRIORITY

This application claims priority from, and is a continuation of, U.S. patent application Ser. No. 15/403,655, filed on Jan. 11, 2017, which is a continuation of U.S. patent application Ser. No. 14/479,564, filed on Sep. 8, 2014 and issued as U.S. Pat. No. 9,560,050, each of which is incorporated herein by reference in its entirety.

FIELD OF THE DISCLOSURE

The present disclosure is generally related to sharing a resource or a capability of a device.

BACKGROUND

An electronic device may include or have access to resources (such as sensors, applications, data, and processing capabilities) that enable a user of the electronic device to perform particular functions. However, each electronic device typically offers a limited set of resources. To make additional resources available to the user, the electronic device may obtain access to resources of another electronic device. For example, a first electronic device may share a resource, such as a file, with a second electronic device after the first electronic device and the second electronic device have connected (e.g., via a network). A communication address associated with the second electronic device is typically used by the first electronic device in order to establish the connection. The communication address may include, for example, a telephone number, an electronic mail (e-mail) address, or a network address. The first electronic device may not be able to share the resource with a third electronic device if the third electronic device is unknown to the first electronic device (e.g., when an identifier corresponding to the third electronic device is not stored in a memory of the first electronic device and is not known to the first user). Additionally, resources may not be shared with "unknown" electronic devices due to security concerns. For example, sharing data or control of a resource with the third electronic device (e.g., an electronic device that is unknown to the first electronic device) may increase a risk of a security breach or "hacking" occurring at the first electronic device. For these reasons, some electronic devices may not be configured to share resources without a prior "relationship" (e.g., prior authentication), which may make it difficult for users of electronic devices to reach an agreement to share a resource.

DETAILED DESCRIPTION

Figure 1:
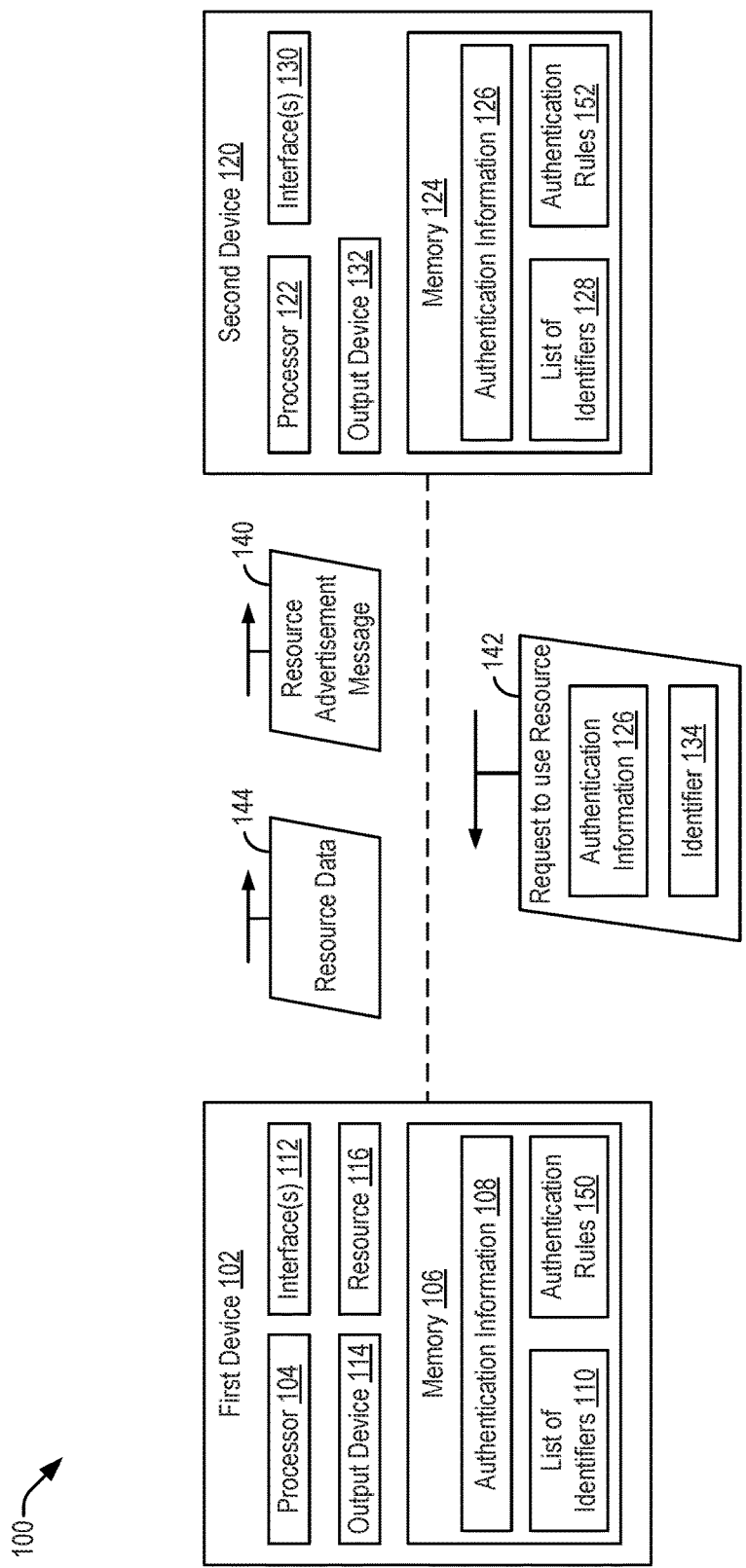
FIG. 1 is a block diagram of a particular embodiment of a system for sharing a resource of a first device with a second device.

To accommodate sharing of a resource (or capability) between devices that are initially unknown to each other, at least one of the devices may be able to authenticate an unknown device and form an ad hoc connection with the unknown device to share a resource. For example, sharing the resource may include sharing multimedia content data captured by a first device (e.g., via a camera or a microphone of a mobile phone, as non-limiting examples) or by a multimedia capture device that is communicatively coupled to the first device. As another example, sharing the resource may include sharing a particular connection to the Internet (e.g., a satellite connection, a cellular connection, etc.) that is available to the first device and unavailable to a second device. To share a resource, the first device may transmit a resource advertisement message to nearby devices including a second device. The resource advertisement message may be transmitted via a short range communications protocol, such as an Institute of Electrical and Electronics Engineers (IEEE) 802.11 protocol (e.g., a wireless communications protocol), a Bluetooth communications protocol, a ZigBee communications protocol, a near-field communication protocol, an infrared communication protocol, a radio frequency (RF) communications protocol, or a combination thereof. When the second device receives the resource advertisement message, the second device may output information derived from the resource advertisement message to a user of the second device. If the user of the second device decides to use the resource of the first device, the second device may transmit, to the first device, a request to use the resource.

To prohibit (e.g., prevent) or to reduce a likelihood of sharing of a resource with untrusted users or devices, the first device, the second device, or a combination thereof, may perform authentication operations prior to sharing the resource. For example, the request transmitted by the second device may include authentication information (e.g., an authentication token) associated with the second device. The authentication information may include an authentication token that enables the first device to authenticate the second device (e.g., to determine that the user of the second device is a subscriber of a service provider). Based on the authentication, a trust relationship may be established for sharing the resource. In a particular embodiment, the authentication is performed at the first device. In an alternate embodiment, the first device sends a received authentication token to a server of the service provider and the authentication is performed by the server. In another particular embodiment, the second device authenticates the first device. For example, the second device may transmit an authentication request to the first device, and the first device may transmit authentication information (e.g., an authentication token) associated with the first device to the second device for use in performing the authentication. In a particular embodiment, additional (e.g., optional) levels of authentication may be performed prior to sharing the resource based on user settings indicating user-selected levels of authentication to be performed.

In a particular embodiment, users or devices negotiate payment for sharing a resource. For example, the resource advertisement message may include an offer price associated with sharing the resource. The request to use the resource transmitted by the second device may include an indication of acceptance of the offer price. Alternatively, after performing the authentication operations, the second device may transmit a bid to the first device. The bid may indicate a bid price that the second user is willing to pay for sharing the resource. The first user may be able to accept the bid price or to propose a counteroffer price, and bidding may continue until a price is agreed upon. When the price is determined (e.g., agreed upon), the first device may transmit an authorization message to the second device and may share the resource with the second device. For example, the resource may be associated with a particular connection to the Internet (e.g., a satellite connection, a cellular connection, etc.) that is available to the first device and unavailable to the second device. In this example, the first device may transmit data received over the particular connection to the second device and/or may receive data from the second device to be transmitted over the particular connection to enable the second device to access the Internet.

The user of the second device may be granted control, or partial control, of the resource as the resource is shared. For example, the second device may receive user input indicating a user selection and may transmit data indicating the user selection to the first device. The first device may control the resource, or control sharing of the resource, in accordance with the data indicating the user selection. In some embodiments, controlling the resource, or sharing of the resource, includes enabling the second device to control capabilities or configurations (e.g., settings) of the first device, such as settings associated with the resource. For example, sharing the resource may include providing (e.g., sharing) multimedia data to the second device. In this example, the first device may change a multimedia capture setting used to generate (e.g., capture) the multimedia data based on the data indicating the user selection. For example, the first device may change a focus, a zoom, a resolution level, or other multimedia capture settings in accordance with the data indicating the user selection. In other embodiments, controlling the resource, or sharing of the resource, includes enabling the second device to provide instructions to an operator of the first device. For example, the data may indicate instructions (e.g., directions) to an operator of the first device (e.g., the first user), the first device may display an output indicating the instructions to the operator, and the operator may capture the multimedia content in accordance with the instructions.

In some embodiments, the first device and the second device do not communicate directly and instead communicate with an arbitration server. The arbitration server may receive multiple resource advertisement messages from multiple devices and may provide a marketplace for bidding on or voting on multiple advertised resources. Additionally, the arbitration server may perform the authentication operations described above. For example, after the arbitration server authenticates the first device, the arbitration server may add an entry to the marketplace corresponding to the resource of the first device. In a particular embodiment, the first device advertises, via the arbitration server, a resource package that includes the resource of the first device and another resource of a different device, a particular operator for the first device, or a combination thereof. Multiple devices including the second device may be authenticated by the arbitration server and may request the resources or resource packages. In a particular embodiment, devices bid on the resource of the first device via the arbitration server, and a particular device associated with a winning bid may be enabled to use the resource of the first device. In other embodiments, multiple devices vote on potential settings associated with the resource, and a setting associated with the resource of the first device may be changed in accordance with a potential setting that receives the most votes, or with multiple potential settings that receive a threshold number of votes. For example, sharing the resource may include sharing multimedia data, and a multimedia capture setting (e.g., a focus or a zoom, as non-limiting examples) may be changed in accordance with a setting that receives the most votes.

In a particular embodiment, a method includes transmitting, from a first device, a message indicating that the first device is available to share a resource. The method includes receiving, at the first device from a second device, a request to use the resource. The request includes authentication information. The method includes, based on a determination that the second device is unknown to the first device, determining whether the second device is authenticated based on the authentication information. The method also includes, in response to determining that the second device is authenticated, sharing the resource of the first device with the second device.

In another particular embodiment, an apparatus includes a processor and a memory that is accessible to the processor and that includes instructions executable by the processor to perform operations. The operations include transmitting a message indicating that a resource is available to be shared. The operations include receiving a request to use the resource from a device. The request includes authentication information. The operations include, based on a determination that the device is unknown, determining whether the device is authenticated based on the authentication information. The operations also include, based on determining that the device is authenticated, enabling sharing of the resource with the device.

In another particular embodiment, a computer-readable storage device stores instructions that, when executed by a processor, cause the processor to perform operations. The operations include transmitting, from a first device, a message indicating that the first device is available to share a resource. The operations include receiving, at the first device from a second device, a request to use the resource. The request includes authentication information. The operations include, based on a determination that the second device is unknown to the first device, determining, at the first device, whether the second device is authenticated based on the authentication information. The operations also include, based on determining that the second device is authenticated, enabling sharing of the resource of the first device with the second device.

FIG. 1 is a block diagram of a particular embodiment of a system 100 for sharing a resource of a first device with a second device. The system 100 includes a first device 102 and a second device 120. The first device 102 and the second device 120 may be mobile electronic devices, such as portable computing devices (e.g., laptop computers, tablet computers, computerized glasses, personal digital assistants, etc.), mobile communication devices (e.g., mobile phones, satellite phones, etc.), still cameras, video cameras, audio capturing devices, sensor devices (e.g., environmental sensor systems), command and control devices, media devices (e.g., portable video/audio players, portable music devices, etc.), game systems, other devices, or combinations thereof.

Although two devices are illustrated in FIG. 1, the number of devices and the types of devices may vary in other embodiments.

The first device 102 includes a processor 104, a memory 106, interface(s) 112 (e.g., a communications interface), an output device 114, and a resource 116. The output device 114 may include, but is not limited to, a display device (e.g., a display screen or a touch screen), a speaker, a connector to enable connection to external devices, another output, or a combination thereof. The memory 106 may store data including settings, media content, and other information. The data includes instructions executable by the processor 104 to perform operations. For example, performing the operations may include sharing the resource 116 with the second device 120, as further described herein. In addition, the memory 106 may store authentication information 108, a list of identifiers 110, and authentication rules 150. The authentication information 108 may include an authentication token that indicates that a user of the first device 102 is a subscriber of a service provider, as further described herein. The list of identifiers 110 may include contact information associated with users or devices that are known to the first device 102, as further described herein. The authentication rules 150 may be used to authenticate another device, as further described herein. The second device 120 may include a processor 122, a memory 124, interface(s) 130, and an output device 132. The memory 124 may store data including settings, media content, and other information, such as instructions executable by the processor 122 to perform operations including accessing the resource 116 of the first device 102, as further described herein. The memory 124 may also store authentication information 126, a list of identifiers 128, and authentication rules 152.

The first device 102 and the second device 120 may communicate with each other and/or with other devices via a communications network (not shown). For example, the communications network may include a wireless network, a cellular network, a cable network, a fiber network, a hybrid fiber/coax network, a switched network (e.g., a public switched telephone network (PTSN) or a packet network (e.g., an internet protocol (IP) network)), an asynchronous transfer mode (ATM) network, a satellite network, other networks, or a combination thereof. The communications network may include routers, wireless routers, local area network devices, modems (e.g., digital subscriber line modems or cable modems), residential gateways, other gateways, border elements, firewalls, switches, call control elements, application servers, other communications devices, or a combination thereof. The first device 102 and the second device 120 may be able to send and/or receive data over the communications network via the interface(s) 112, 130, respectively.

Additionally or in the alternative, the first device 102 and the second device 120 may communicate via a local area network using a short range communications protocol. For example, the interface(s) 112, 130 may include short range communications interfaces that operate in accordance with an Institute of Electrical and Electronics Engineers (IEEE) 802.11 protocol (e.g., a wireless communications protocol), a Bluetooth protocol, another radio frequency (RF) protocol, an infrared protocol, a near-field communications protocol, other communications protocols, or a combination thereof. The first device 102 and the second device 120 may exchange (e.g., send and/or receive) data via the short range communications protocol. For example, the first device 102 and the second device 120 may share the resource 116 via the short range communications protocol, as further described herein.

In a particular embodiment, a first user of the first device 102 and a second user of the second device 120 are subscribers of a service provider. For example, the first user and the second user may be subscribers of a wireless service provider, a media content service provider, an Internet service provider, a "triple-play" service provider, a resource sharing service provider (e.g., a service provider that provides an application to the first device 102 and to the second device 120 to enable sharing of resources), another service provider, or a combination thereof. When the first user subscribes to a service of the service provider, the first device 102 may store the authentication information 108 in the memory 106, and when the second user subscribes to a service of the service provider, the second device 120 may store the authentication information 126 in the memory 124. The authentication information 108, 126 may include corresponding authentication tokens that may be stored in a database of a service provider server (e.g., an arbitration server) for providing authentication confirmation, as described with reference to FIG. 4. The authentication information 108, 126 (e.g., the authentication tokens) may be used to confirm that the users of the devices 102, 120 are subscribers of the service provider, which may indicate a level of trust that the first user and/or the second user is a real person and is able to be reached via the service provider.

The first device 102 may include a resource 116 that is capable of being shared with other devices. As used herein, sharing a resource includes sharing data associated with an element of the first device 102 or an external device that is communicatively coupled to the first device 102. For example, the resource 116 may include data associated with a camera, a microphone, a satellite interface, a wireless interface, a cellular interface, or a combination thereof. As another example, when the resource 116 is associated with an external device, the resource 116 may include data received by the first device 102 from a multimedia capture device, a sensor array, a drone aircraft, or a combination thereof. As another example, the resource 116 may include data from an application running on the first device 102.

During operation, when the first user of the first device 102 decides to offer the resource 116 for sharing, the first device 102 may transmit (e.g., broadcast) a resource advertisement message 140 to other devices. In a particular embodiment, the first device 102 transmits the resource advertisement message 140 to one or more addressable recipients (e.g., devices that are addressable via the communications network). In another particular embodiment, the first device 102 transmits the resource advertisement message 140 as a broadcast message to one or more devices within a communications range (e.g., a range of the short range communication protocol) of the first device 102.

When the second device 120 is within the communications range, the second device 120 may receive the resource advertisement message 140 from the first device 102. The resource advertisement message 140 may indicate a type of the resource 116, information associated with the resource 116, an offer price for sharing the resource 116, or a combination thereof. The second device 120 may output information derived from the resource advertisement message 140 to the second user via the output device 132. When the second user decides to access (e.g., use) the resource 116, the second user may cause the second device 120 (e.g., via a user input) to send a request 142 to use the resource 116 to the first device 102.

In response to receiving the request 142, the first device 102 may determine whether the second device 120 is an unknown device. To illustrate, the request 142 may include an identifier 134 associated with the second device 120, the second user of the second device 120, or a combination thereof. Although the identifier 134 is illustrated as distinct from the authentication information 126, in other embodiments, the authentication information 126 includes or serves as the identifier 134. The first device 102 may search the memory 106 to determine whether the identifier 134 is included in the list of identifiers 110 in the memory 106. The list of identifiers 110 may include identifiers of "known" contacts to the first user of the first device 102. For example, the list of identifiers 110 may include an address list, a phone book, an electronic messenger list, a list of device identification numbers, or another list of identifiers that may be associated with devices of known contacts. A device that is associated with an identifier that is not stored in the list of identifiers 110 may be referred to as "unknown" to the first device 102. In response to a determination that the identifier 134 is included in the list of identifiers 110, the first device 102 may determine that the second device 120 is a known device and may share the resource 116 with the second device 120 without performing additional authentication operations.

In response to a determination that the identifier 134 is not included in the list of identifiers 110, the first device 102 determines that the second device 120 is unknown to the first device 102. In this case, the first device 102 may perform an authentication operation to authenticate the second device 120 prior to sharing the resource 116 with the second device 120. The authentication operation may be performed based on the authentication information 126 associated with the second device 120. For example, the request 142 may include the authentication information 126, and the first device 102 may determine whether the second device 120 is authenticated (e.g., by performing the authentication operation) based on the authentication information 126.

In a particular embodiment, the authentication information 126 includes an authentication token associated with the second device 120. The authentication token may indicate that the second device 120 is associated with a subscriber of the service provider. For example, when the second user subscribes to the service provider, the second device 120 may receive the authentication token from the service provider. Additionally, when the first user subscribes to the service provider, the first device 102 may receive an authentication token (included in the authentication information 108) from the service provider. The authentication tokens may provide a level of trust because the first device 102 and the second device 120 are both associated with subscribers to a common service provider, and that the subscribers (e.g., the first user or the second user) may be traced or contacted via the service provider. In other embodiments, the authentication information 108 and 126 (e.g., the authentication tokens) may include pre-programmed information associated with the first device 102 and the second device 120, respectively. For example, the authentication information 108 and/or 126 may include embedded credentials in smartchips of the first device 102 and/or the second device 120, certificates stored in the memory 106 and/or 124, other preprogrammed information, or a combination thereof.

The first device 102 may authenticate the second device 120 based on the authentication information 126 (e.g., the authentication token). In a particular embodiment, an authentication operation is performed at the first device 102. For example, the memory 106 may include the authentication rules 150, which may include rules, authentication token formats, or a combination thereof, used to authenticate other devices. The first device 102 may determine whether the second device 120 is authenticated based on the authentication rules 150. For example, the first device 102 may determine whether the authentication token is valid by comparing the authentication token (e.g., the authentication information 126) to the authentication rules 150. In this embodiment, the authentication operation may be performed by the first device 102 without network support (e.g., the first device 102 may authenticate the second device 120 without accessing a network connection). In another embodiment, the authentication operation is performed external to the first device 102, and the first device 102 authenticates the second device 120 based on results of the authentication operation. For example, the first device 102 may send a request for authentication that includes the authentication information 126 to a server of the service provider via a network (e.g., a cellular network, a satellite network, another wide area network, etc.), and the first device 102 may receive a confirmation of authentication from the server when the authentication information 126 is valid. In this example, the server may compare the authentication information 126 to a list of authentication information associated with subscribers of the service provider to determine whether the authentication information 126 is confirmed. Additionally, the second device 120 may authenticate the first device 102 based on the authentication information 108 (e.g., the authentication token), as further described with reference to FIG. 2.

When the second device 120 is authenticated (e.g., based on the authentication information 126), the first device 102 may determine to share the resource 116 with the second device 120. Sharing the resource 116 may include sharing data associated with the resource 116 with the second device 120. For example, the first device 102 may transmit resource data 144 to the second device 120 to share the resource 116. Additionally or alternatively, sharing the resource 116 may include the first device 102 receiving data from the second device 120 to be used by the resource 116. In a particular embodiment, a setting of the first device 102 is modified and/or the resource 116 is shared in accordance with an instruction received from the second device 120, as further described with reference to FIG. 3.

In a particular embodiment, prior to sharing the resource 116, a price for sharing the resource 116 is negotiated. For example, the resource advertisement message 140 may indicate an offer price set by the first user or the first device 102 for sharing the resource 116. The second device 120 may output (e.g., display) the offer price (and the resource advertisement message 140) to the second user via the output device 132. When the second user agrees to pay the offer price, the request 142 may include an indication of acceptance of the offer price. In this example, the first device 102 may share the resource 116 with the second device 120 in exchange for payment at the offer price. However, when the second user does not agree to the offer price, the second device 120 may transmit a bid to the first device 102. The bid may indicate a bid price that the second user is willing to pay to use the resource 116. The first device 102 may output (e.g., display) the bid to the first user via the output device 114. When the first user accepts the bid price, the first device 102 may begin sharing the resource 116. When the first user does not accept the bid device, the first device 102 may transmit a counteroffer, and the bidding and counteroffering may continue until the first user and the second user agree on a particular price, after which the first device 102 begins sharing the resource 116. In a particular embodiment, payment confirmation and processing are provided by the service provider. For example, the users may provide credit card information or bank information to the service provider, and the service provider may process the payment. In some embodiments, payment includes credits from the service provider instead of money. In another particular embodiment, payment may be provided and verified by a third party payment provider. For example, the users may exchange account numbers associated with the third party payment provider, and the third party payment provider may process the payment.

In a particular embodiment, multiple devices may bid for use of the resource 116. For example, the first device 102 may transmit the resource advertisement message 140 to the second device 120 and to a third device (not shown). The second device 120 and the third device may each bid for use of the resource 116. The first device 102 may receive the bids and may determine a winning device associated with a highest bid. The first device 102 may share the resource 116 with the winning device. In a particular embodiment, the multiple devices (e.g., the second device 120 and the third device) bid via an arbitration server, as further described with reference to FIG. 4.

In a particular embodiment, the resource 116 is shared with multiple devices. For example, the first device 102 may transmit the resource advertisement message 140 to the second device 120 and to the third device (not shown). The second device 120 and the third device may bid for use of the resource 116. In response to the bid, the first device 102 may share the resource 116 with the second device 120 and the third device. In another particular embodiment, the second device 120 bids for the resource 116, and the resource 116 is shared with other devices based on rules associated with the second device 120, a network service provider, a resource service provider, an owner of a location or venue where the first device 102 is located, other parties, or a combination thereof. For example, the user of the second device 120 may indicate that the resource 116 is to be shared with the third device or a network service provider may cause the resource 116 to be shared with other devices associated with other subscribers.

As an example of a specific use case, the first device 102 may be a satellite phone at a remote location, such as a campsite, and the resource 116 may correspond to a satellite connection to the Internet. The second device 120 may be a mobile phone at a different campsite, and the second device 120 may be unable to establish a cellular connection to access the Internet. The first user may be willing to share the resource 116 (e.g., the satellite connection to the Internet) with nearby devices for a particular price. The first device 102 may transmit the resource advertisement message 140 to nearby campsites, and the second device 120 may receive the resource advertisement message 140. The second user may be searching for a means to access the Internet and may cause the second device 120 to transmit the request 142 to the first device 102. The devices 102 and 120 may perform authentication operations and price negotiation operations (e.g., bidding operations). When the devices 102 and 120 are configured to perform authentication operations without network support, the authentication operations may be performed at the devices 102 and 120. When the devices 102 and 120 are configured to perform authentication operations using a network (e.g., via a server), the first device 102 may temporarily share a network connection (e.g., via a temporary end-to-end hypertext transfer protocol secure (HTTPS) connection or a temporary secure sockets layer (SSL) connection) with the second device 120 to enable authentication tokens to be obtained and/or verified by the first device 102 and/or by the second device 120. In response to successful authentication and a determination of an agreed-upon price, the first device 102 may share the resource 116 (e.g., the satellite connection) with the second device 120. For example, the first device 102 may route data (e.g., the resource data 144) from the Internet to the second device 120 and may receive data from the second device 120 for routing to the Internet.

As another example of a specific use case, the first device 102 may include or have access to a media device, such as a camera, a microphone, or a combination thereof. Sharing the resource 116 may include providing (e.g., transmitting) multimedia content from the first device 102 to the second device 120. In this example, the second user of the second device 120 may be able to control an aspect of the capture of the multimedia content. For example, the second user of the second device 120 may be able to control a multimedia capture setting or to provide an instruction (or a setting of the media device) to an operator of the first device 102, as further described with reference to FIG. 3.

Figure 2:
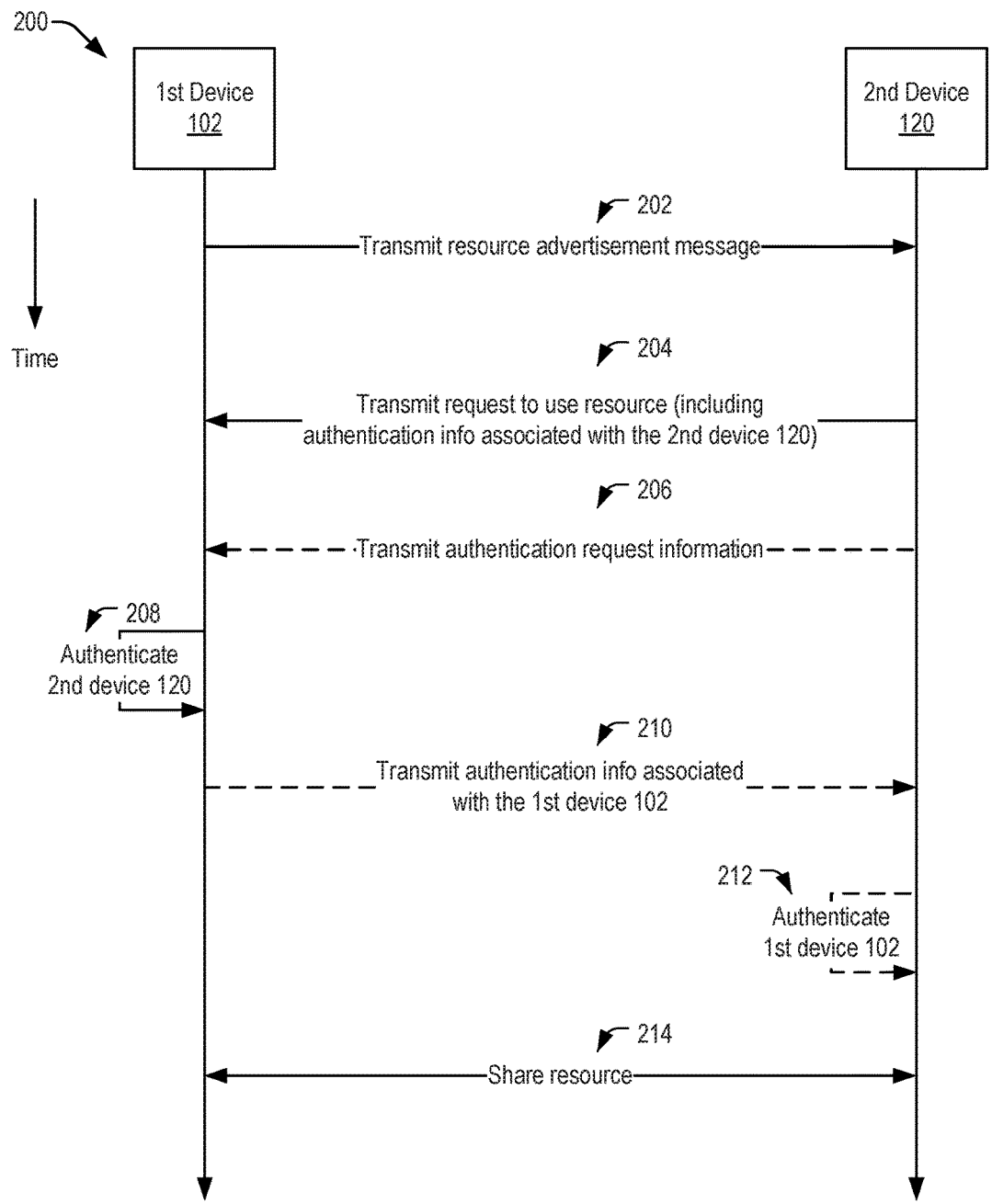
FIG. 2 is a ladder diagram to illustrate an illustrative method of sharing a resource between a first device and a second device.

Referring to FIG. 2, a ladder diagram illustrating a particular embodiment of a method 200 of sharing a resource between a first device and a second device is shown. The method 200 may be performed by the first device 102 and the second device 120 of FIG. 1.

When the first user of the first device 102 decides to share the resource 116, the first device 102 may transmit a resource advertisement message, such as the resource advertisement message 140 of FIG. 1, to the second device 120, at 202. When the second user of the second device 120 decides to use the resource 116, the second device 120 transmits a request to use the resource, such as the request 142 of FIG. 1, at 204. The request 142 may include the authentication information 126 associated with the second device 120.

The first device 102 may determine that the second device 120 is unknown to the first device 102 (e.g., that an identifier associated with the second device 120 is not stored in the memory 106 of the first device 102) and may authenticate the second device 120 based on the authentication information 126, at 208. Authenticating the second device 120 may include determining whether the authentication information 126 (e.g., an authentication token) associated with the second device 120 indicates that the second device 120 is associated with a subscriber of a service provider. In a particular embodiment, the determination is performed at the first device 102 (e.g., based on the authentication rules 150). In another particular embodiment, the first device 102 transmits the authentication information 126 (e.g., the authentication token) to a server to perform the determination, and the first device 102 may receive a confirmation of authentication from the server when the authentication information 126 is associated with a subscriber (e.g., is valid).

In a particular embodiment, the first device 102 authenticates the second device 120, and the second device 120 does not authenticate the first device 102 (e.g., the device sharing the resource performs authentication operations and the device receiving access to the resource does not perform authentication operations). In another particular embodiment, both the first device 102 and the second device 120 perform authentication operations. In this embodiment, the second device 120 requests authentication information from the first device 102. For example, the second device 120 may transmit an authentication request to the first device 102, at 206. In a particular embodiment, the authentication request is distinct from the request 142 (e.g., the request to use the resource). In an alternate embodiment, the request 142 includes the authentication request. In response to receipt of the authentication request, the first device 102 may transmit the authentication information 108 associated with the first device 102 to the second device 120, at 210. The second device 120 may authenticate the first device 102 at 212. For example, the second device 120 may determine whether the authentication information 108 (e.g., an authentication token) indicates that the first device 102 is associated with a subscriber of the service provider. The determination may be performed at the second device 120 (e.g., based on the authentication rules 152) or at the server of the service provider, in a similar manner to the authentication of the second device 120 at 208. In another particular embodiment, the second device 120 authenticates the first device 102 and the first device 102 does not authenticate the second device 120. In yet another particular embodiment, neither of the devices 102, 120 performs authentication operations. For example, the first device 102 may share a "non-sensitive" resource (e.g., data from an environmental sensor coupled to the first device 102, as a non-limiting example) without requiring authentication of the second device 120.

Whether or not the devices 102, 120 perform the authentication operations may be controlled based on user settings associated with the devices 102, 120. For example, the first user may set the user settings associated with the first device 102 to cause the first device 102 to perform authentication operations when providing a shared resource, to perform authentication operations when receiving access to a shared resource, to perform authentication operations when providing or receiving access to a shared resource, or not to perform authentication operations. In a similar manner, the second device 120 may perform authentication operations based on user settings associated with the second device 120. In a particular embodiment, additional levels of authentication are performed by the first device 102 and/or the second device 120 based on the user settings. For example, after the first device 102 authenticates the second device 120 based on the authentication information 126, the first device 102 may request additional authentication information, such as a name associated with the second user, a phone number associated with the second user, an electronic mail (e-mail) address associated with the second user, or a combination thereof, from the second device 120. The additional authentication information may further identify the second user and may reduce a likelihood of sharing the resource 116 with an unintended device (or user). Additionally or alternatively, the second device 120 may request additional authentication information from the first device 102 and perform additional authentication operations to reduce a likelihood of connecting with an unintended device (or user) to use a resource.

After the first device 102 determines that the second device 120 is authenticated (and after the second device 120 determines that the first device 102 is authenticated in at least some embodiments), the first device 102 may share the resource 116 with the second device 120, at 214. Sharing the resource may include sharing data between the first device 102 and the second device 120. For example, when the resource 116 corresponds to a satellite interface capable of connecting to the Internet via a satellite connection, sharing the resource 116 may include transmitting data received via the satellite interface from the first device 102 to the second device 120, receiving data from the second device 120 for transmission over the Internet via the satellite interface, or a combination thereof. In other embodiments where the resource 116 is a different resource, other data is shared between the first device 102 and the second device 120 to share the resource 116.

Figure 3:
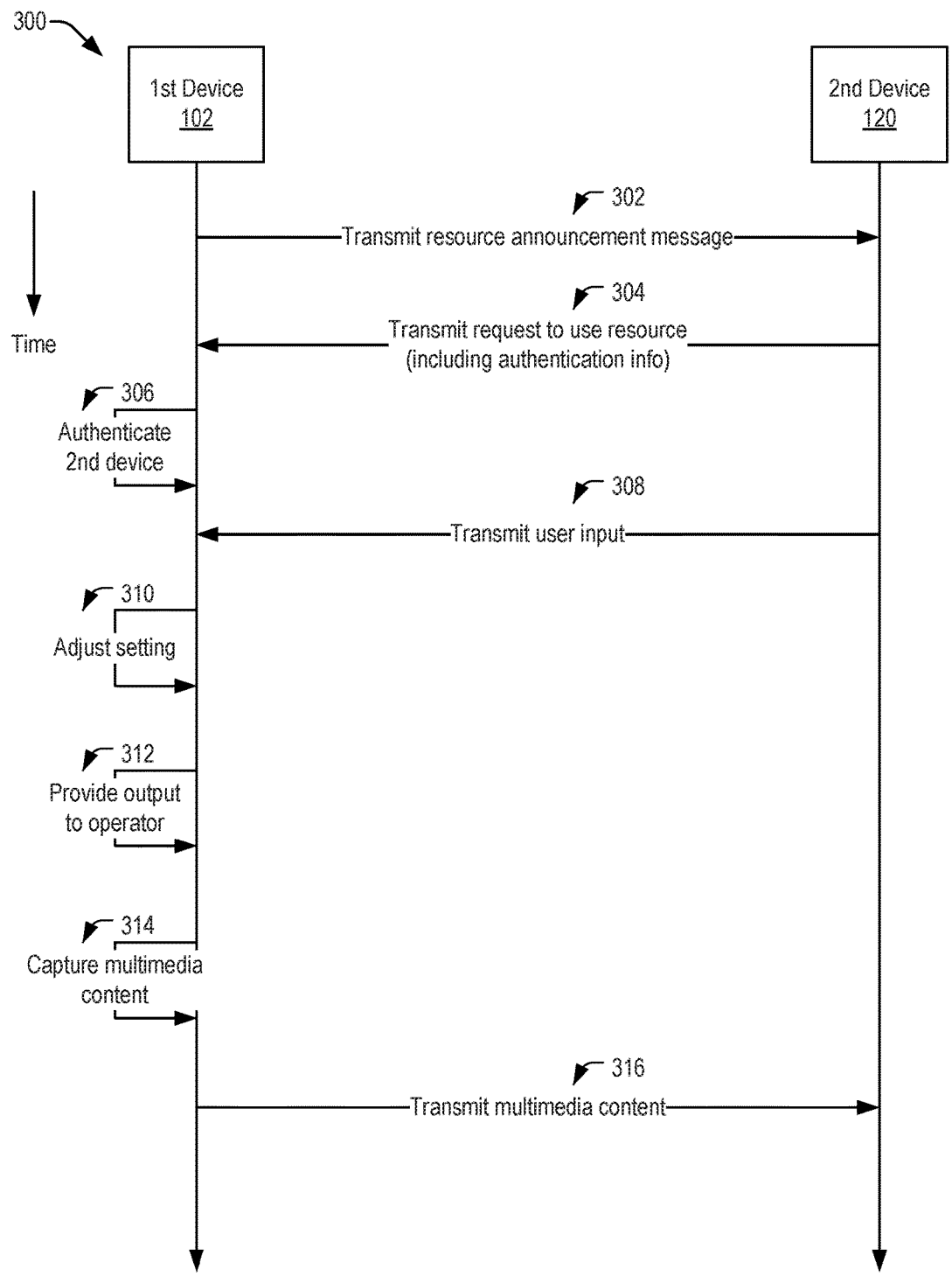
FIG. 3 is a ladder diagram to illustrate an illustrative method of sharing a resource between a first device and a second device.

Referring to FIG. 3, a ladder diagram illustrating a particular embodiment of a method 300 of sharing a resource between a first device and a second device is shown. The method 300 may be performed by the first device 102 and the second device 120 of FIG. 1. In the embodiment depicted FIG. 3, sharing the resource 116 may include sharing captured multimedia content. For example, the first device 102 may include or have access to a media device, such as a camera, a microphone, or a combination thereof. Sharing the resource 116 may include providing (e.g., transmitting) multimedia content from the first device 102 to the second device 120.

When the first user of the first device 102 decides to share the resource 116, the first device 102 may transmit a resource advertisement message, such as the resource advertisement message 140 of FIG. 1, to the second device 120, at 302. When the second user of the second device 120 decides to use the resource 116, the second device 120 transmits a request to use the resource, such as the request 142 of FIG. 1, at 304. The request 142 may include the authentication information 126 associated with the second device 120.

The first device 102 may determine that the second device 120 is unknown to the first device 102 (e.g., that an identifier associated with the second device 120 is not stored in the memory 106 of the first device 102) and may authenticate the second device 120 based on the authentication information 126, at 308. The authentication may be performed in a similar manner to the authentication performed at 208 in FIG. 2. In other embodiments, the second device 120 authenticates the first device 102, both of the devices 102, 120 perform authentication operations, or neither of the devices 102, 120 perform authentication operations, as described with reference to FIG. 2.

After the authentication operation(s) are performed, the second device 120 may receive a user input from the second user and may transmit data indicating the user input to the first device 102, at 308. The user input may include a user selection associated with capture of the multimedia content. The second device 120 may output (e.g., display) a graphical user interface (GUI) via the output device 132 of the second device 120 and may receive a user input from the second user. In a particular embodiment, the first device 102 transmits data indicating available options associated with capturing the multimedia content (e.g., sharing the resource) to the second device 120 and the second device 120 generates the GUI based on the available options. The GUI may include a plurality of selectable multimedia capture settings to enable the second user to control one or more of the available options (e.g., aspects) associated with capture of the multimedia content. For example, the GUI may display buttons or sliders to enable the second user to select a focus, a location, a mobility path, a zoom level, a quality level, a three-dimensional setting, an audio setting, or a combination thereof, associated with capture of the multimedia content. In response to receiving the user selection (e.g., the user input), the second device 120 may transmit data indicating the user selection to the first device 102.

The first device 102 may receive the data indicating the user selection from the second device 120, and in response to receiving the data indicating the user selection, may adjust a multimedia capture setting, at 310. For example, the first device 102 may adjust a focus, a zoom level, a pan, a tilt, a quality level, a three-dimensional setting, an audio setting, or a combination thereof, based on the user selection. To illustrate, the first device 102 may be coupled to a movable camera, such as a camera coupled to a motorized tripod or a camera coupled to a drone aircraft, and a location or a mobility path may be adjusted based on the data indicating the user selection. The data indicating the user selection may be transmitted from the second device 120 to the first device 102 in real-time or near real-time.

In a particular embodiment, the user input includes a multimedia capture instruction for capturing multimedia content. The multimedia capture instruction may include instructions for an operator of the first device 102 (or the media device accessed by the first device 102). When the user input includes the multimedia capture instruction, the first device 102 may provide an output to the operator via the output device 114, at 312. For example, the first device 102 may provide a visual output and/or a text output via the output device 114 indicating the multimedia capture instruction. As another example, the first device 102 may provide an audio output of the multimedia capture instruction via a speaker of the first device 102.

The multimedia content may be captured, at 314, in accordance with the user selection. For example, the first device 102 (or the media device communicatively coupled to the first device 102) may capture the multimedia content in accordance with the adjusted multimedia capture setting. As another example, when the user selection includes the multimedia capture instruction, the multimedia content may be captured by an operator in accordance with the multimedia capture instruction.

In a particular embodiment, the operator is the first user, and the first user captures the multimedia content in accordance with the multimedia capture instruction. For example, the multimedia content may be captured during a sporting event, and the multimedia capture instruction may indicate that video or audio associated with a particular player should be captured. As another example, the multimedia content may be captured during a parade, and the multimedia capture instruction may indicate a particular location from which to capture the multimedia content, a particular direction to capture multimedia content, a path to move while capturing the multimedia content, other instructions, or a combination thereof. In another particular embodiment, the operator is different than the first user, and the different operator may be known for a particular attribute. For example, the operator may be a cameraman who is known for providing close-up shots, a particular director who is known for an "aggressive" directing style, a particular editor who is known for a "sedate" editing style, other operators, or a combination thereof. In this example, the multimedia capture instruction may be associated with the particular attribute of the operator.

After the multimedia content is captured (in accordance with the data indicating the user selection), the multimedia content may be transmitted (e.g., provided) from the first device 102 to the second device 120, at 316. In this manner, the operations depicted in FIG. 3 enable the second user to control capture of the multimedia content (e.g., in real-time or near-real time) instead of selecting from among multiple static options provided by a media content provider.

In a particular embodiment, control of the resource (e.g., control of the capture of the multimedia content) is granted to multiple devices. For example, the second device 120 and a third device (not shown) may bid together for control of the multimedia content capture, and the multimedia content may be captured in accordance with data indicating user selections from the second device 120 and the third device.

In another particular embodiment, control of the multimedia content capture is shared with multiple devices based on an indication from a winning device. For example, the second device 120 may bid for and win control of the multimedia content capture, and the second device 120 may indicate to the first device 102 that control is also to be shared with the third device. In these embodiments, authentication operations associated with the third device may be performed prior to sharing control of the resource (e.g., the multimedia content capture).

In another particular embodiment, sharing the resource does not include providing data. For example, the second device 120 may receive multimedia content of an event from a multimedia capture device associated with a multimedia content provider, and the resource may be a resource present at the event that affects the multimedia content being captured by the multimedia capture device without providing data to the second device 120. In this example, the resource may be a light, a microphone, a special effect generator, or some other device that modifies the multimedia content being captured by the multimedia capture device. The second device 120 may bid for and win control of the resource (or operator), and the second device 120 may select to enable or disable the resource (e.g., may select to turn on a particular light or turn off the particular light).

Figure 4:
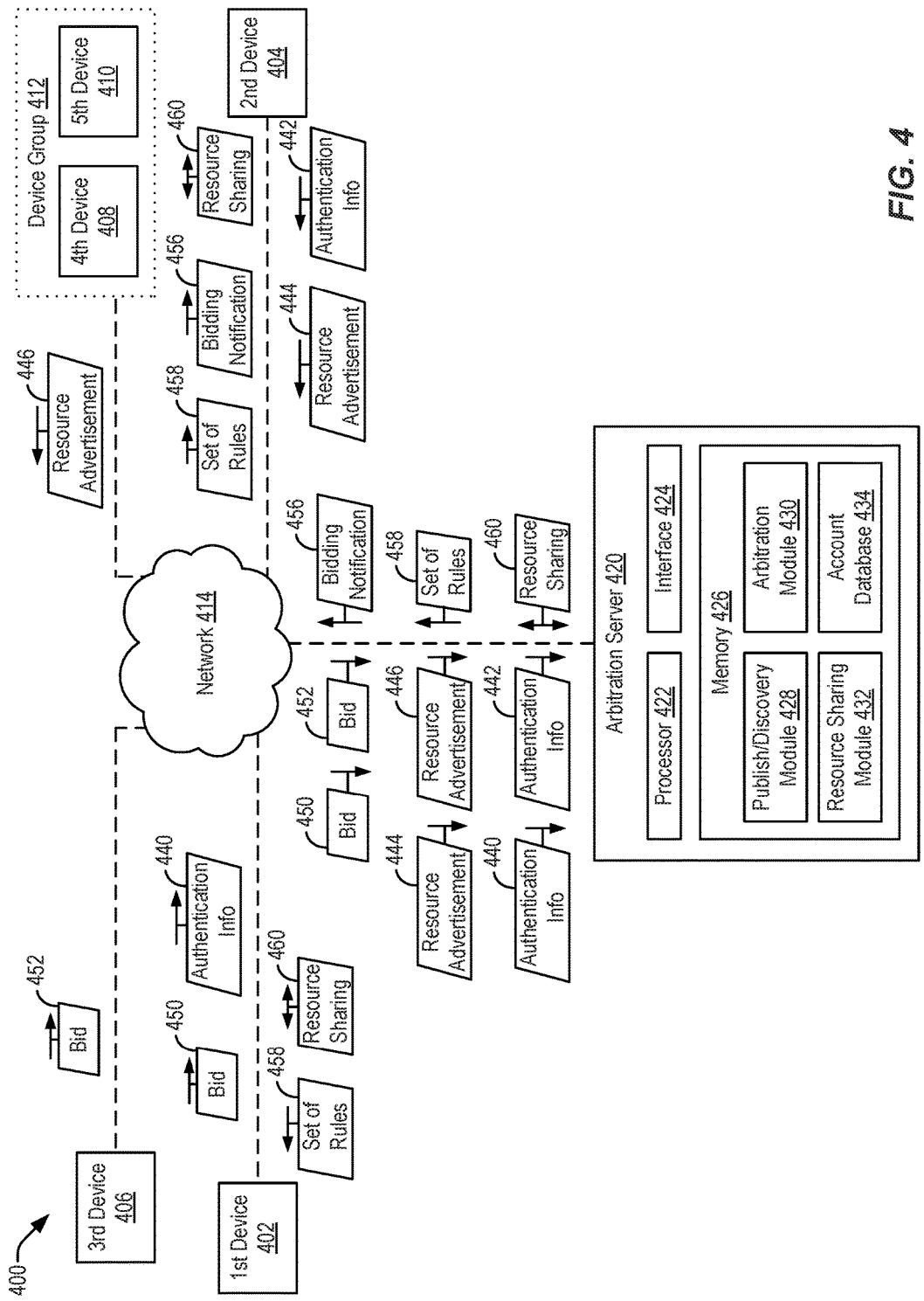
FIG. 4 is a block diagram of a particular embodiment of a system for providing arbitrated sharing of a resource between multiple devices using a server.

FIG. 4 is a block diagram of a particular embodiment of a system 400 for providing arbitrated sharing of a resource between multiple devices using a server. The system 400 includes a first device 402, a second device 404, a third device 406, a fourth device 408, a fifth device 410, and an arbitration server 420. The devices 402-410 and the arbitration server 420 may communicate via a network 414. The network 414 may include a wireless network, a cellular network, a cable network, a fiber network, a hybrid fiber/coax network, a switched network (e.g., a public switched telephone network (PTSN) or a packet network (e.g., an internet protocol (IP) network)), an asynchronous transfer mode (ATM) network, a satellite network, other networks, or a combination thereof. The network 414 may include routers, local area network devices, modems (e.g., a digital subscriber line modems or cable modems), residential gateways, other gateways, border elements, firewalls, switches, call control elements, application servers, other elements, or a combination thereof. In a particular embodiment, the arbitration server 420 is associated with a network service provider, such as a provider of the network 414. In other embodiments, the arbitration server 420 is associated with a different service provider, such as a telephone service provider, a media content service provider, an Internet service provider, a "triple-play" service provider, a resource sharing service provider, or a combination thereof. The devices 402-410 may include similar components as the devices 102, 120 of FIG. 1, such as processors, memories, interfaces, and output devices (not shown). The devices 402-410 may also communicate with the arbitration server 420, and the arbitration server 420 may provide arbitrated sharing of a resource of one or more of the devices 402-410.

The arbitration server 420 may include a processor 422, an interface 424, and a memory 426. The interface 424 may be a communications interface that sends or receives data via the network 414. The memory 426 may include an account database 434 that includes a plurality of authentication tokens (e.g., authentication information) associated with a plurality of subscribers of the service provider. The memory 426 may include instructions executable by the processor 422 to perform operations. For purposes of description, instructions for arbitration server 420 are illustrated in FIG. 4 as organized into functional modules. For example, the memory may include a publish/discovery module 428, an arbitration module 430, and a resource sharing module 432.

The publish/discovery module 428 may be executed by the processor 422 to discover and authenticate the devices 402-410. When the devices 402-410 connect to the arbitration server 420, the devices 402-410 may transmit authentication information, such as authentication tokens, to the arbitration server 420. For example, the first device 402 may transmit authentication information 440 (e.g., a first authentication token) to the arbitration server 420, and the second device 404 may transmit authentication information 442 (e.g., a second authentication token) to the arbitration server 420. Authentication information transmissions from the devices 406-410 are not illustrated for convenience. When the arbitration server 420 receives the authentication information 440 and the authentication information 442, the arbitration server 420 may execute the publish/discovery module 428 to authenticate the first device 402 and the second device 404. For example, the arbitration server 420 may use the first authentication token to determine whether a first user of the first device 402 is a subscriber of the service provider. When the first device 402 and the second device 404 are associated with subscribers, the arbitration server 420 may provide arbitrated sharing of resources, as further described herein. When at least one of the first device 402 and the second device 404 are not authenticated, the arbitration server 420 may not provide arbitrated sharing of resources to the at least one unauthenticated device.

Additionally, the publish/discovery module 428 may be executed by the processor 422 to provide a marketplace of available shared resources. The devices 402-410 may access the marketplace, via the arbitration server 420, to request to use a resource or to advertise a resource for sharing. For example, the second device 404 may transmit a resource advertisement 444 to the arbitration server 420. The resource advertisement 444 may include a request to advertise that a particular resource of the second device 404 is available for sharing. The arbitration server 420 may dynamically add an entry to the marketplace based on the request (e.g., based on the resource advertisement 444). In some embodiments, the resource advertisement 444 is provided to the first device 402, to the third device 406, or to both, by the arbitration server 420.

Entries in the marketplace may correspond to a single resource, such as the resource of the second device 404, or to a resource package. A resource package may include multiple resources from multiple devices grouped as the resource package, a resource of a particular device and an operator distinct from the particular device grouped as the resource package, or a combination thereof. For example, the fourth device 408 and the fifth device 410 may form a device group 412, and the device group 412 may transmit a resource advertisement 446 to the arbitration server 420 including a request to advertise a resource package. The resource package may include a resource of the fourth device 408, a resource of the fifth device 410, information related to a particular operator, or a combination thereof. In response to receiving the resource advertisement 446, the arbitration server 420 may add an entry corresponding to the resource package to the marketplace.

Entries in the marketplace may be dynamically added or removed as devices connect to or disconnect from the arbitration server 420. For example, as additional devices connect to the arbitration server 420, additional entries corresponding to resources of the additional devices may be added to the marketplace, and when one of the devices 402-410 disconnects from the arbitration server 420, an entry corresponding to the disconnecting device may be removed from the marketplace. Thus, the marketplace may represent a real-time or near-real time list of resources available for sharing. The devices 402-410 may output (e.g., display) an output indicating the entries in the marketplace. For example, the arbitration server 420 may provide a list of resources advertised in the marketplaces to the devices 402-410, and the devices 402-410 may output (e.g., display) a GUI that indicates the list of resources.

The arbitration module 430 may be executed by the processor 422 to arbitrate the sharing of resources between two or more of the devices 402-410. In a particular embodiment, the arbitration module 430 arbitrates the sharing of resources in accordance with a bidding system. The bidding system may enable the devices 402-410 to bid for resources or resource packages in the marketplace. For example, after an entry corresponding to the particular resource of the second device 404 is added to the marketplace, devices may bid to share the resource. The arbitration server 420 may receive the bids and determine a winning device based on the bids. The arbitration server 420 may indicate the winning device to the device sharing the resource. For example, a first user of the first device 402 may cause (e.g., via a user input) the first device 402 to transmit a first bid 450 to the arbitration server 420. Additionally, a third user of the third device 406 may cause the third device 406 to transmit a second bid 452 to the arbitration server 420. The arbitration server 420 may determine a highest bid from among the first bid 450 and the second bid 452. When the first bid 450 is higher than the second bid 452 (e.g., when a first amount indicated by the first bid 450 is greater than a second amount indicated by the second bid 452), the arbitration server 420 may determine that the first bid 450 is the highest bid. After determining that the first bid 450 is the highest bid (and prior to enabling sharing of the resource), the arbitration server 420 may transmit a bidding notification 456 to the second device 404. In a particular embodiment, the arbitration server 420 accepts bids for a threshold time period, and determines the highest bid upon expiration of the threshold time period. The bidding notification 456 may indicate that the first device 402 is the winning device (e.g., is associated with the highest bid) and may indicate an amount of the highest bid (e.g., the first amount). Although two devices (e.g., the first device 402 and the third device 406) are described as bidding, more than two devices or fewer than two devices may bid for the resource. Additionally, although each of the devices 402, 406 is described as bidding individually for the resource, in another embodiment the first device 402 and the third device 406 form a second device group and bid together for the resource. In this embodiment, the first user associated with the first device 402 and the third user associated with the third device 406 are each responsible for a portion of the total bid, and the resource of the second device 404 is shared with both the first device 402 and the third device 406.

In an alternate embodiment, the arbitration module 430 is executed to arbitrate the sharing of resources in accordance with a voting system. For example, devices may vote for a particular aspect associated with sharing the resource, such as a setting associated with the resource, an operator associated with the resource, an instruction to the operator, another aspect of sharing the resource, or a combination thereof. The arbitration server 420 may determine a particular aspect or setting associated with the most votes after a threshold time period and may send a voting notification to the second device 404 indicating the particular aspect or setting. The resource may be shared in accordance with the particular aspect or setting. In another embodiment, the arbitration server 420 determines multiple aspects or settings that receive more than a threshold number of votes, and the multiple aspects or settings are provided in the voting notification.

The resource sharing module 432 may be executed by the processor 422 to enable sharing of a resource between multiple devices. For example, after determining that the first device 402 is associated with the highest bid, the resource sharing module 432 may be executed by the processor 422 to cause the server to enable the second device 404 to share the resource with the first device 402. For example, resource sharing 460 may be performed by the first device 402 and the second device 404 by transferring data associated with the resource between the first device 402 and the second device 404. In this example, data transmitted by the first device 402 may be forwarded by the arbitration server 420 to the second device 404 to share the resource. Additionally, data transmitted by the second device 404 may be forwarded by the arbitration server 420 to the first device 402 to share the resource. As a particular example, the resource may be a multimedia capture device, and the resource may be shared by the second device 404 transmitting data, via the arbitration server 420, to the first device 402. Additionally, executing the resource sharing module 432 may cause the arbitration server 420 to generate a set of rules 458 and to transmit the set of rules 458 to the first device 402 and to the second device 404. The set of rules 458 may indicate rules for sharing the resource, and the resource may be shared between the first device 402 and the second device 404 in accordance with the set of rules 458. As a particular example, the resource may be a drone aircraft, and the set of rules 458 may indicate safety rules and regulations associated with operating drone aircrafts.

The system 400 may enable the devices 402-410 to share resources in an arbitrated manner. For example, the arbitration server 420 may enable arbitrated sharing of captured multimedia media content during a particular event, such as a baseball game. In this example, a content provider may provide a default multimedia content stream associated with the baseball game (e.g., a telecast of the game). However, some users may be willing to pay for more control over the capture of multimedia content than is provided by a single telecast. Additionally, some users who are attending the baseball game may be willing to provide multimedia content in return for payment. The arbitration server 420 may generate the marketplace to enable the different users to advertise an offer to capture multimedia content (e.g., to share a resource) or to find an offer to share multimedia content to bid on. To illustrate, a first user may be willing to pay to see actions of a particular player (e.g., a first baseman), and a second user may be attending the game and may be seated behind first base. The second user may connect to the arbitration server 420 and advertise an availability to capture multimedia content from behind first base. The first user may cause the first device 402 to connect to the arbitration server 420 and may bid for control of the multimedia captured by the second device 404. The arbitration server 420 may arbitrate the bidding process, and when the first device 402 is associated with a highest bid, the arbitration server 420 may facilitate sharing of the multimedia content (e.g., the resource) between the first device 402 and the second device 404. In a particular embodiment, the first device 402 transmits data indicating a user selection to the second device 404 via the arbitration server 420, and a multimedia capture setting is adjusted based on the user selection or a media capture instruction associated with the user selection is provided to an operator of the second device 404, as described with reference to FIG. 3. Additionally, the arbitration server 420 may provide payment authentication and verification services, as described with reference to FIG. 1. In another particular embodiment, the arbitration server 420 arbitrates sharing of control of the resource (e.g., the capture of the multimedia content) with one or more winning devices (e.g., the first device 402) and provides the captured multimedia content to multiple devices (e.g., the first device 402, the third device 406, and/or other devices).

Figure 5:
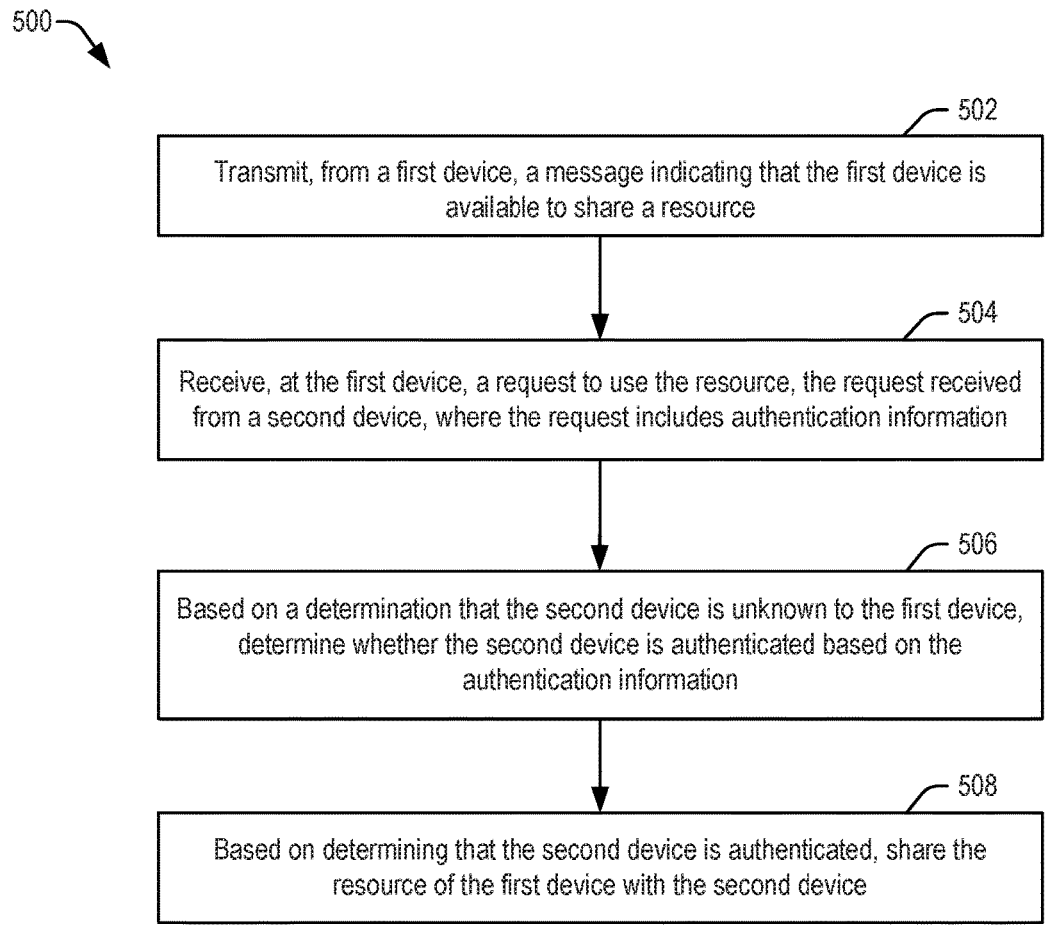
FIG. 5 is a flowchart of a first embodiment of a method to share a resource of a first device with a second device.

Referring to FIG. 5, a flowchart of a particular embodiment of a method 500 to share a resource of a first device with a second device is shown. The method 500 may be performed by one or more of the devices 102 and 120 of FIGS. 1-3 or by one or more of the devices 402-410 of FIG. 4.

The method 500 includes transmitting, from a first device, a message indicating that the first device is available to share a resource, at 502. For example, with reference to FIG. 1, the first device 102 may transmit the resource advertisement message 140 indicating that the first device 102 is available to share the resource 116.

The method 500 includes receiving, at the first device from a second device, a request to use the resource, at 504. For example, with reference to FIG. 1, the first device 102 may receive the request 142 from the second device 120. The request may include authentication information. For example, with reference to FIG. 1, the request 142 may include the authentication information 126 associated with the second device 120.

The method 500 includes, based on a determination that the second device is unknown to the first device, determining whether the second device is authenticated based on the authentication information, at 506. For example, with reference to FIG. 1, based on a determination that the second device 120 is unknown to the first device 102, the first device 102 may determine whether the second device 120 is authenticated based on the authentication information 126. In a particular embodiment, the first device includes a memory that includes identifiers of devices, and the determination that the second device is unknown to the first device is based on a search of the memory. For example, with reference to FIG. 1, the first device 102 may search the list of identifiers 110 stored in the memory 106 to determine whether the second device 120 is unknown to the first device 102. The first device 102 may determine that the second device 120 is unknown when an identifier of the second device 120 (e.g., the identifier 134 included in the request 142) is not in the list of identifiers 110. In another particular embodiment, the authentication information includes an authentication token, and determining whether the second device is authenticated includes sending the authentication token to an authentication server. The authentication server may determine whether the second device is associated with a subscriber of a service provider based on the authentication token. Determining whether the second device is authenticated further includes receiving an indication of authentication from the authentication server after the authentication server determines that the second device is associated with a subscriber of the service provider. For example, the first device 102 may send the authentication information 126 (e.g., an authentication token) to an authentication server (such as the arbitration server 420 of FIG. 4), and the first device 102 may receive an indication of authentication from the server after the authentication information 126 is authenticated by the authentication server. When the second device 120 is known, the first device 102 may share the resource 116 with the second device 120 without performing an authentication operation or transmitting the authentication information 126 to the authentication server.

The method 500 includes, based determining that the second device is authenticated, sharing the resource of the first device with the second device, at 508. For example, with reference to FIG. 1, the first device 102 may share the resource 116 with the second device 120 in response to a determination that the second device 120 is authenticated (e.g., based on the authentication information 126). In a particular embodiment, sharing the resource with the second device includes transmitting data to the second device, receiving data from the second device, or a combination thereof. For example, with reference to FIG. 1, the first device 102 may transmit the resource data 144 to the second device 120 in FIG. 1.

In a particular embodiment, sharing the resource includes sharing multimedia content, and the method 500 includes, after determining that the second device is authenticated, receiving data from the second device indicating a user selection and adjusting a multimedia capture setting of a multimedia capture device based on the data. For example, with reference to FIG. 3, the first device 102 may receive, from the second device 120, data indicating a user selection received at the second device 120 at 308, and the first device 102 may adjust the multimedia capture setting based on the data at 310. The multimedia capture device may be part of the first device (e.g., a camera or a microphone of the first device) or a multimedia capture device that is communicatively coupled to the first device. The multimedia capture setting may include a focus, a location, a mobility path, a zoom level, a quality level, a three-dimensional setting, an audio setting, or a combination thereof. In this embodiment, the method 500 further includes capturing multimedia content based on the multimedia capture setting and providing the multimedia content to the second device. For example, with reference to FIG. 3, the first device 102 may capture the multimedia content after adjusting the multimedia capture setting at 314, and the first device 102 may transmit the multimedia content to the second device 120 at 316. Additionally or alternatively, the user selection may include a multimedia capture instruction and the multimedia content may be captured in accordance with the multimedia capture instruction. The method 500 may further include providing an output indicating the multimedia capture instruction to an operator of the first device. The output may include an audio output, a visual output, a text output, or a combination thereof. For example, with reference to FIG. 1, the first device 102 may output (e.g., display) the multimedia capture instruction via the output device 114, and the multimedia content may be captured by an operator (e.g., the first user or a different operator) in accordance with the multimedia capture instruction.

In a particular embodiment, the method 500 includes sending, to an arbitration server from the first device, a request to advertise that the resource is available to be shared. For example, the first device may correspond to the second device 404 of FIG. 4, which may send the resource advertisement 444 to the arbitration server 420. The arbitration server may dynamically add an entry to a marketplace of available shared resources based on the request to advertise and may enable a user of another device to bid for the resource. For example, after the arbitration server 420 adds an entry to a marketplace of available shared resources based on the resource advertisement 444, the first device 402 may bid (e.g., by transmitting the first bid 450) to use the resource of the second device 404. In another particular embodiment, multiple devices bid for the resource and a winning device is determined by the arbitration server based on bids from the multiple devices. A bidding notification from the arbitration server to the first device may indicate that the second device is associated with a highest bid for the resource. For example, with reference to FIG. 4, the arbitration server 420 may receive the first bid 450 from the first device 402 and the second bid 452 from the third device 406. The arbitration server 420 may determine that the first device 402 is the winning device based on the first bid 450 being a highest bid, and the arbitration server 420 may transmit the bidding notification 456 to the second device 404 to indicate the first device 402 as the winning device.

Figure 6:
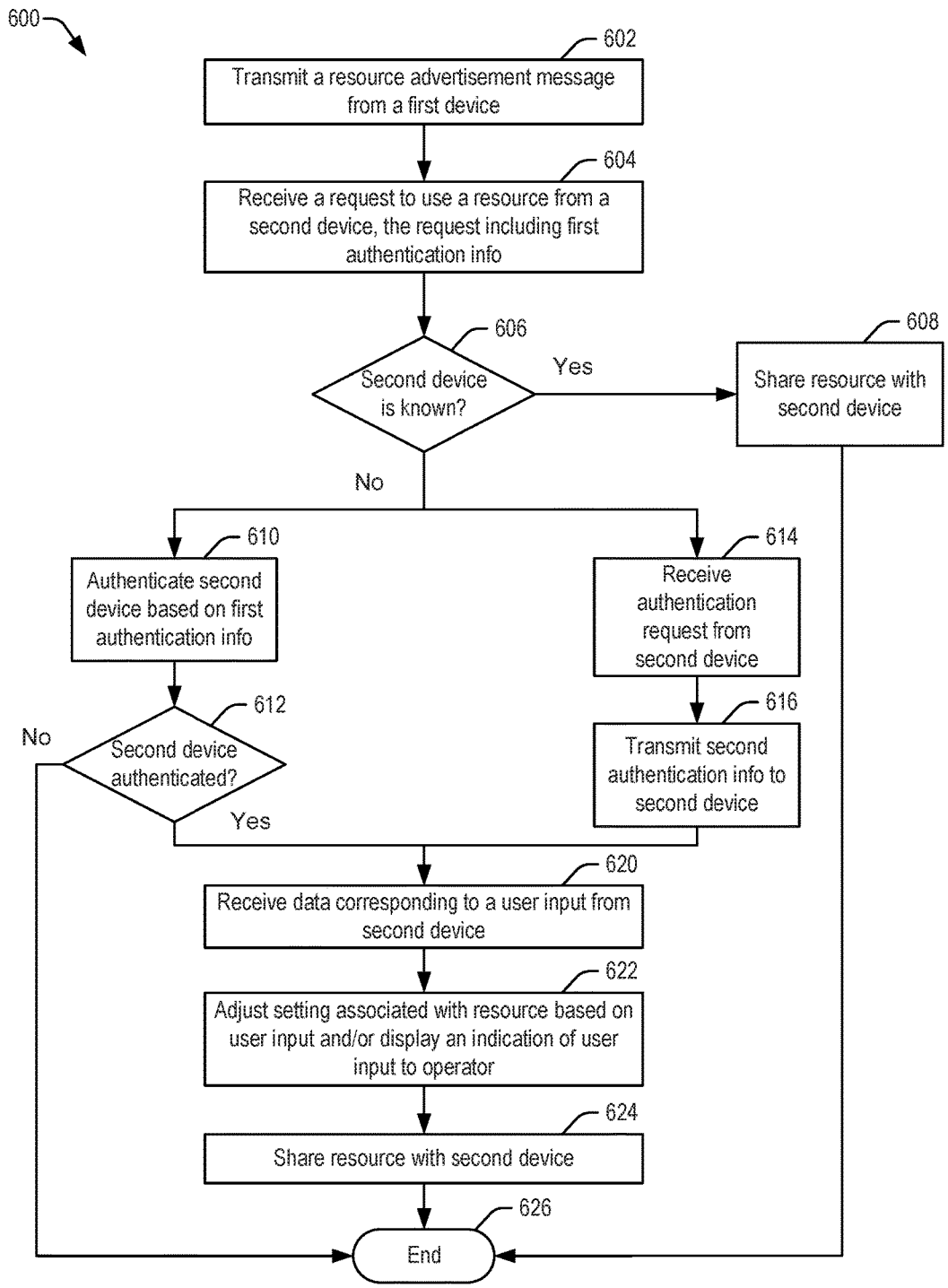
FIG. 6 is a flowchart of a second embodiment of a method to share a resource of a first device with a second device.

Referring to FIG. 6, a flowchart of a particular embodiment of a method 600 to share a resource of a first device with a second device is shown. The method 600 may be performed by the devices 102 and 120 of FIGS. 1-3 or the devices 402-410 of FIG. 4.

The method 600 includes transmitting a resource advertisement message, at 602. For example, with reference to FIG. 1, the first device 102 may transmit the resource advertisement message 140 to the second device 120. The method 600 includes receiving a request to use a resource from a second device, at 604. For example, with reference to FIG. 1, the first device 102 may receive the request 142 from the second device 120. The request may include first authentication information, such as the authentication information 126 in FIG. 1.

The method 600 includes determining whether the second device is known, at 606. For example, with reference to FIG. 1, the first device 102 may determine whether the second device 120 is known. The first device 102 may determine whether the second device 120 is known by searching the memory 106 (e.g., the list of identifiers 110) for an identifier that corresponds to the second device 120, such as the identifier 134. In response to determining that the second device is known (e.g., determining that the second device is associated with an identifier stored in the memory), the method 600 includes sharing the resource with the second device, at 608. For example, the resource may be shared without performing authentication operations at the first device 102 or the second device 120. After sharing the resource, the method 600 may end at 626.

In response to determining that the second device is unknown (e.g., determining that the second device is not associated with an identifier stored in the memory), the method 600 includes authenticating the second device based on the first authentication information, at 610. For example, with reference to FIG. 1, the first device 102 may authenticate the second device 120 based on the authentication information 126. The method 600 includes determining whether the second device is authenticated, at 612. In response to determining that the second device is not authenticated, the method 600 may end at 626. In response to determining that the second device is authenticated, the method may continue to 620. The determination whether the second device 120 is authenticated may be performed at the first device 102 or at a server of the service provider, as described with reference to FIG. 1.

Additionally, the method 600 may include receiving an authentication request from the second device, at 614. For example, with reference to FIG. 2, the first device 102 may receive an authentication request at 206. The method 600 includes transmitting second authentication info to the second device, at 616. For example, with reference to FIG. 2, the first device 102 may transmit the second authentication information (e.g., the authentication information 108) to the second device 120 at 210. The second authentication information may be used by the second device 120 to authenticate the first device 102. When the second device 120 authenticates the first device 102, the method 600 continues to 620. When the second device 120 fails to authenticate the first device 102, the method 600 ends (e.g., the second device 120 may send a negative acknowledgement or may not send an acknowledgement to the first device 102, and the first device 102 may not share the resource 116 with the second device 120). In a particular embodiment illustrated in FIG. 6, each of the first device 102 and the second device 120 performs authentication operations. Alternatively, the first device 102 does not perform authentication operations (e.g., steps 610 and 612 are omitted). Additionally or alternatively, the second device 120 does not perform authentication operations (e.g., steps 614 and 616 are omitted). In an alternate embodiment, the first device 102 and the second device 120 do not perform authentication operations (e.g., the method 600 proceeds from 606 to 620).

The method 600 includes receiving data corresponding to a user input from the second device, at 620. For example, with reference to FIG. 3, the first device 102 may receive data corresponding to a user input from the second device 120 at 308. The method 600 includes adjusting a setting associated with the resource based on the user input and/or outputting (e.g., displaying) an indication of the user input to an operator, at 622. For example, with reference to FIG. 3, the first device 102 may adjust a multimedia capture setting in accordance with a user selection (e.g., a user input) at 310 or may provide an output indicating a media capture instruction associated with the user selection (e.g., the user input) at 312. The method 600 includes sharing the resource with the second device, at 624. For example, with reference to FIG. 1, the first device 102 may share the resource 116 with the second device 120 by transmitting the resource data 144 to the second device 120. The method 600 may end at 626.

Various embodiments disclosed herein describe systems and methods for sharing a resource of a first device with a second device. The first device may share the resource with the second device even though the second device is initially unknown to the first device (e.g., an identifier of the second device is not stored in a memory of the first device). Authentication operations may be performed by the first device and/or the second device to determine whether the devices are associated with subscribers of a service provider. Determining that the devices are associated with subscribers of the service provider may provide a trust relationship between the devices suitable for sharing the resource. For example, a user of the first device may rely on the authentication operations to trust that an agreed upon payment for sharing the resource will be verified and supported by the service provider, and a user of the second device may rely on the authentication operations to trust that the resource will be shared in accordance with rules provided by the service provider.

Figure 7:
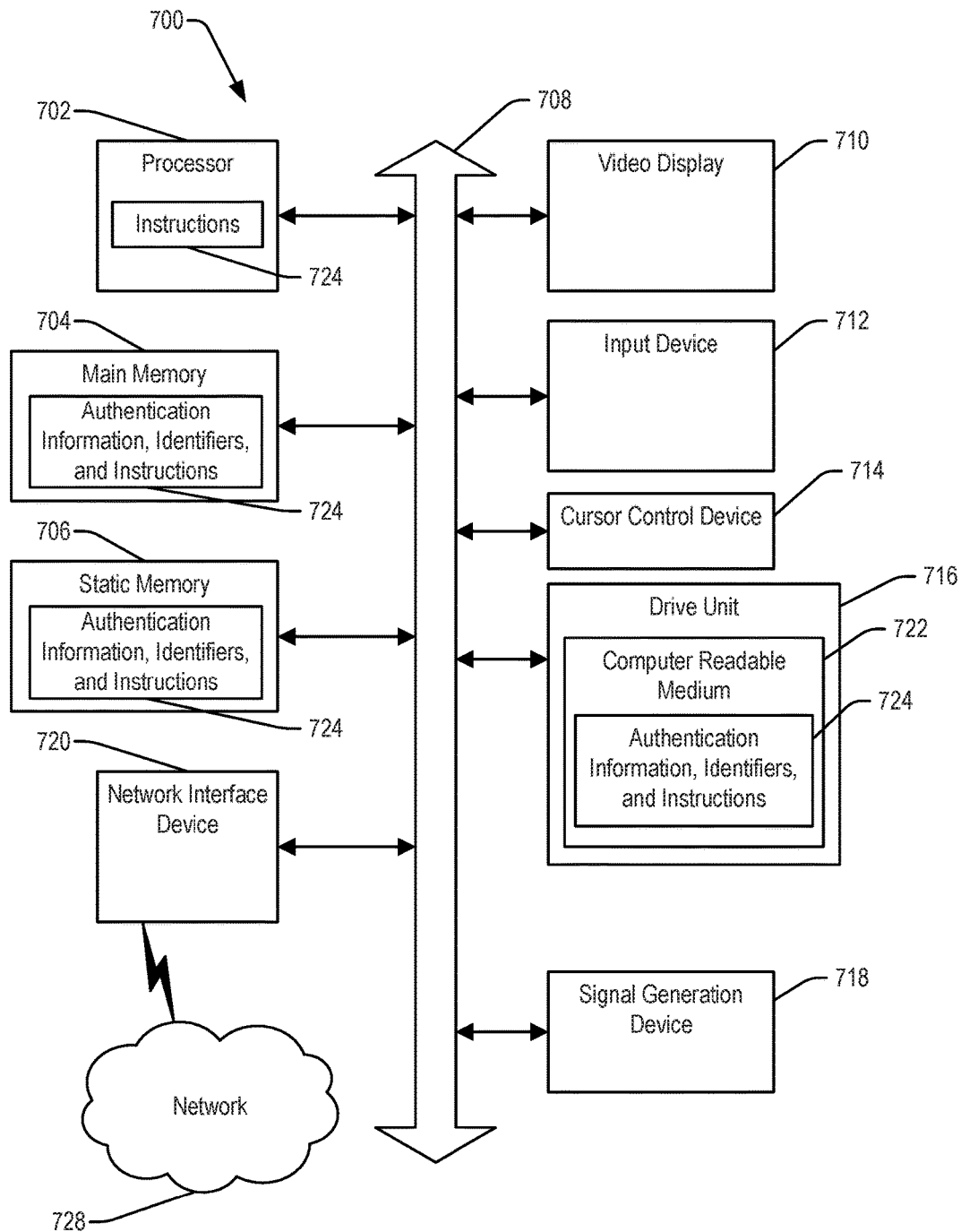
FIG. 7 is a block diagram of an illustrative embodiment of a general computer system.

Referring to FIG. 7, an illustrative embodiment of a general computer system is shown and is designated 700. The computer system 700 includes a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within any one or more of the first device 102, the second device 120, or combinations thereof described with reference to FIGS. 1-3, the devices 402-410, or combinations thereof described with reference to FIG. 4.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), a set-top box (STB), a customer premises equipment device, an endpoint device, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. For example, the processor 702 may include or correspond to the processor 104 of the first device 102 or the processor 122 of the second device 120 of FIG. 1. Moreover, the computer system 700 may include a main memory 704 and a static memory 706, which can communicate with each other via a bus 708. For example, the main memory 704 may include or correspond to the memory 106 of the first device 102 or the memory 124 of the second device 120 of FIG. 1. As shown, the computer system 700 may further include a video display unit 710, such as a liquid crystal display (LCD), a light emitting diode (LED) display, a touch screen display, a flat panel display, a solid state display, or a lamp assembly of a projection system. Additionally, the computer system 700 may include an input device 712, such as a remote control device (e.g., a television remote or a set-top box remote) or a keyboard, and a cursor control device 714, such as a mouse. In some embodiments, the input device 712 and the cursor control device 714 may be integrated into a single device, such as a capacitive touch screen input device. The computer system 700 may also include a drive unit 716, a signal generation device 718, such as a speaker or remote control, and a network interface device 720. Some computer systems 700 may not include an input device (e.g., a server may not include an input device).

In a particular embodiment, as depicted in FIG. 7, the drive unit 716 may include a computer-readable storage device 722 in which authentication information, identifiers, and one or more sets of instructions 724, e.g. software, can be embedded. The computer-readable storage device 722 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. A computer-readable storage device is not a signal. Further, the instructions 724 may embody one or more of the methods or logic as described herein. The instructions 724 may be executable by the processor 702 to perform one or more functions or methods described herein, such as the methods 500 or 600 described with reference to FIG. 5 or FIG. 6, respectively. In a particular embodiment, the authentication information, identifiers, and instructions 724 may reside completely, or at least partially, within the main memory 704, the static memory 706, and/or within the processor 702 during execution by the computer system 700. The main memory 704 and the processor 702 also may include a computer-readable storage device. The authentication information included in the authentication information, identifiers, and instructions 724 in the drive unit 716, the main memory 704, the static memory 706, the processor 702, or combinations thereof may be transmitted to another computer system to enable authentication of the computer system 700, and the identifiers may include a list of identifiers used to authenticate the other computer system, prior to sharing a resource with the other computer system.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes a computer-readable storage device 722 that stores the authentication information, identifiers, and instructions 724 or receives, stores and executes instructions included in the authentication information, identifiers, and instructions 724, so that a device connected to a network 728 may communicate voice, video or data over the network 728. While the computer-readable storage device 722 is shown to be a single device, the computer-readable storage device 722 may include a single device or multiple devices, such as a centralized or distributed database, and/or associated caches and servers that store one or more sets of instructions. The computer-readable storage device 722 is capable of storing a set of instructions for execution by a processor to cause a computer system to perform any one or more of the methods or operations disclosed herein.

In a particular non-limiting, exemplary embodiment, the computer-readable storage device 722 may include a solid-state memory such as embedded memory (or a memory card or other package that houses one or more non-volatile read-only memories). Further, the computer-readable storage device 722 may be a random access memory or other volatile re-writable memory. Additionally, the computer-readable storage device 722 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 700 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   transmitting, from a first device, a message indicating that the first device is available to share a resource;
   receiving, at the first device, a request to use the resource, the request received from a second device, wherein the request includes authentication information;
   based on a determination that the second device is unknown to the first device, determining whether the second device is authenticated based on the authentication information;
   receiving, at the first device from the second device, settings information associated with the resource;
   adjusting a setting of the first device based on the settings information; and
   based on determining that the second device is authenticated, sharing the resource of the first device with the second device.

2. The method of claim 1, further comprising:
   receiving an authentication request from the second device; and
   sending first device authentication information to the second device in response to the authentication request.

3. The method of claim 1, wherein the message is sent to an arbitration server, and wherein the message comprises a request to advertise that the resource is available to be shared.

4. The method of claim 3, wherein the arbitration server dynamically adds an entry to a marketplace of available shared resources based on the request to advertise, and wherein the arbitration server enables a user of the second device to bid to use the resource.

5. The method of claim 4, wherein the entry in the marketplace indicates that the resource is part of a resource package, and wherein the resource package indicates a second resource associated with a third device, information related to a particular operator, or a combination thereof.

6. The method of claim 1, wherein the first device includes a memory that includes identifiers of devices, and wherein the determination that the second device is unknown to the first device is based on a search of the memory.

7. The method of claim 1, wherein the sharing the resource with the second device comprises transmitting data to the second device, receiving data from the second device, or a combination thereof.

8. The method of claim 1, wherein the resource includes data associated with a camera, a microphone, a satellite interface, a wireless interface, a cellular interface, or a combination thereof.

9. The method of claim 1, wherein the resource includes data received by the first device from a multimedia capture device, a sensor array, a drone aircraft, or a combination thereof.

10. The method of claim 1, wherein the authentication information includes an authentication token.

11. An apparatus comprising:
    a processor; and
    a memory accessible to the processor, the memory comprising instructions executable by the processor to perform operations, the operations comprising:
       transmitting a message indicating that a resource is available to be shared;
       receiving a request to use the resource from a device; and
       after determining that the device is authenticated:
          sending setting options for the resource to the device;
          adjusting a setting for the resource based on data received from the device responsive to the setting options;
          receiving resource data from the resource based on the setting; and
          sharing the resource data with the device.

12. The apparatus of claim 11, further comprising an output device coupled to the processor, wherein the operations further comprise:
    receiving operator use instructions from the device; and
    sending the operator use instructions to the output device.

13. The apparatus of claim 12, wherein the output device comprises a speaker.

14. The apparatus of claim 12, wherein the output device comprises a display device.

15. The apparatus of claim 11, wherein the request includes an authentication request, and wherein the operations further comprise sending authentication information to the device in response to receipt of the authentication request.

16. A computer-readable storage device storing instructions that, when executed by a processor, cause the processor to perform operations, the operations comprising:
    receiving a message indicating that a resource of a first device is available to be shared;
    sending, to the first device, a request to use the resource; and
    in response to an acceptance of the request at the first device:
       receiving setting options from the first device, the setting options corresponding to settings for the resource;
       sending settings information associated with the resource to the first device based on the settings options; and receiving resource data associated with the resource from the first device, the resource data based on the settings information.

17. The computer-readable storage device of claim 16, wherein the request includes authentication information.

18. The computer-readable storage device of claim 17, wherein the authentication information includes an authentication token.

19. The computer-readable storage device of claim 16, wherein the resource data includes data received by the first device from a multimedia capture device, a sensor array, a drone aircraft, or a combination thereof.

20. The computer-readable storage device of claim 16, wherein the resource data includes data associated with a camera, a microphone, a satellite interface, a wireless interface, a cellular interface, or a combination thereof.

\* \* \* \* \*